US012239958B2

(12) United States Patent
Nam et al.

(10) Patent No.: US 12,239,958 B2
(45) Date of Patent: Mar. 4, 2025

(54) SUPER ABSORBENT POLYMER COMPOSITION AND PREPARATION METHOD FOR THE SAME

(71) Applicant: LG Chem, Ltd., Seoul (KR)

(72) Inventors: Dae Woo Nam, Daejeon (KR); Jin Seok Seo, Daejeon (KR); Sujin Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 606 days.

(21) Appl. No.: 17/631,746

(22) PCT Filed: Sep. 29, 2020

(86) PCT No.: PCT/KR2020/013303
§ 371 (c)(1),
(2) Date: Jan. 31, 2022

(87) PCT Pub. No.: WO2021/066503
PCT Pub. Date: Apr. 8, 2021

(65) Prior Publication Data
US 2022/0274092 A1    Sep. 1, 2022

(30) Foreign Application Priority Data

Sep. 30, 2019  (KR) .................. 10-2019-0120943
Sep. 28, 2020  (KR) .................. 10-2020-0126245

(51) Int. Cl.
| | |
|---|---|
| *B01J 20/26* | (2006.01) |
| *C08F 120/06* | (2006.01) |
| *C08J 3/24* | (2006.01) |
| *C08K 5/053* | (2006.01) |
| *C08K 5/1565* | (2006.01) |

(52) U.S. Cl.
CPC ........... *B01J 20/267* (2013.01); *B01J 20/261* (2013.01); *C08F 120/06* (2013.01); *C08J 3/245* (2013.01); *C08K 5/053* (2013.01); *C08K 5/1565* (2013.01); *B01J 2220/68* (2013.01); *C08K 2201/019* (2013.01)

(58) Field of Classification Search
CPC .... B01J 20/261; B01J 20/267; B01J 2220/68; C08F 2/48; C08F 20/04; C08F 120/06; C08F 220/06; C08J 3/24; C08J 3/245; C08J 2333/00; C08K 5/0025; C08K 5/053; C08K 5/109; C08K 5/1565
See application file for complete search history.

(56) References Cited

U.S. PATENT DOCUMENTS

| | | | |
|---|---|---|---|
| 4,765,393 A | 8/1988 | Baxter | |
| 8,865,828 B2 | 10/2014 | Daniel et al. | |
| 9,328,207 B2 | 5/2016 | Funk et al. | |
| 2004/0181031 A1 | 9/2004 | Nogi et al. | |
| 2007/0106013 A1 | 5/2007 | Adachi et al. | |
| 2007/0141338 A1 | 6/2007 | Ishizaki et al. | |
| 2008/0075937 A1 | 3/2008 | Wada et al. | |
| 2012/0001122 A1 | 1/2012 | Wattebled et al. | |
| 2014/0031473 A1 | 1/2014 | Nogi et al. | |
| 2015/0273433 A1 | 10/2015 | Nakatsuru et al. | |
| 2015/0360204 A1 | 12/2015 | Tachi et al. | |
| 2016/0375171 A1 | 12/2016 | Omori et al. | |
| 2017/0044332 A1 | 2/2017 | Kimura et al. | |
| 2018/0194904 A1* | 7/2018 | Lee | C08F 20/56 |
| 2019/0099739 A1 | 4/2019 | Lee et al. | |
| 2020/0010624 A1 | 1/2020 | Nam et al. | |
| 2020/0223991 A1 | 7/2020 | Sohn et al. | |

FOREIGN PATENT DOCUMENTS

| | | |
|---|---|---|
| CN | 1530384 A | 9/2004 |
| CN | 102361653 A | 2/2012 |
| CN | 105848776 A | 8/2016 |
| EP | 1641883 B1 | 2/2012 |
| EP | 2669318 A1 | 12/2013 |
| EP | 2896454 A1 | 7/2015 |
| EP | 2905072 A1 | 8/2015 |
| EP | 2952537 A1 | 12/2015 |
| EP | 3085439 A1 | 10/2016 |
| JP | 2006116535 A | 5/2006 |
| JP | 2015120933 A | 7/2015 |
| KR | 20070083761 A | 8/2007 |
| KR | 20150059454 A | 6/2015 |
| KR | 20170033634 A | 3/2017 |
| KR | 20180067940 A | 6/2018 |
| KR | 20180074384 A | 7/2018 |
| KR | 20190051685 A | 5/2019 |
| KR | 20190064978 A | 6/2019 |
| WO | 2005092956 A1 | 10/2005 |
| WO | 2015093594 A1 | 6/2015 |
| WO | 2018147317 A1 | 8/2018 |

OTHER PUBLICATIONS

International Search Report for Application No. PCT/KR2020/013303 mailed Jan. 13, 2021, pp. 1-3.
Odian, G. "Principles of Polymerization" Dec. 1981, p. 203, Wiley.
Schwalm, R. "UV Coatings Basics, Recent Developments and New Applications," Dec. 2006, p. 115, Elsevier.
Search Report dated Nov. 17, 2022 from the Office Action for Chinese Application No. 202080053018.1 issued Nov. 29, 2022, pp. 1-3. [See p. 2, categorizing the cited references].

(Continued)

*Primary Examiner* — Brian A McCaig
(74) *Attorney, Agent, or Firm* — Lerner David LLP

(57) ABSTRACT

This invention relates to a superabsorbent polymer composition and a method for preparing the superabsorbent polymer composition. According to the present disclosure, there are provided a superabsorbent polymer composition that can exhibit a rapid absorption time without using a blowing agent, and a method for preparing the superabsorbent polymer composition.

16 Claims, No Drawings

(56) References Cited

OTHER PUBLICATIONS

Kiatkamjornwong. S. "Superabsorbent Polymers and Superabsorbent Polymer Composites" Science Asia, Jan. 2007, pp. 39-43, vol. 33, No. S1.
Extended European Search Report including Written Opinion for Application No. 20872077.1 dated Jul. 22, 2022, pp. 1-13.
Inda, Edana "Standard Test Methods for the Nonwovens Industry," Worldwide Strategic Partners, Edition 2005, 105 pages.
Third Party Observation for Application No. PCT/KR2020/013303 submitted Jan. 28, 2022, pp. 1-20.

\* cited by examiner

SUPER ABSORBENT POLYMER COMPOSITION AND PREPARATION METHOD FOR THE SAME

CROSS-REFERENCE TO RELATED APPLICATION(S)

This application is a national phase entry under 35 U.S.C. § 371 of International Application No. PCT/KR2020/013303, filed on Sep. 29, 2020, which claims priority to Korean Patent Application No. 10-2019-0120943, filed on Sep. 30, 2019, and Korean Patent Application No. 10-2020-0126245, filed on Sep. 28, 2020, the disclosures of which are herein incorporated by reference in their entirety.

BACKGROUND OF THE INVENTION

(a) Field of the Invention

This invention relates to a superabsorbent polymer composition and a method for preparing the same. More specifically, this invention relates to a superabsorbent polymer composition that can exhibit rapid absorption speed without using a blowing agent, and a method for preparing the same.

(b) Description of the Related Art

Super absorbent polymer (SAP) is synthetic polymer material that can absorb moisture of 500 to 1000 times of self-weight, and is also named differently as super absorbency material (SAM), absorbent gel material (AGM), etc. according to developing companies. The superabsorbent polymer began to be commercialized as sanitary items, and currently, it is being widely used as hygienic goods such as disposable diapers, sanitary pads, and the like, water-holding material for soil, water stop material for civil engineering and architecture, sheets for raising seedling, freshness preservatives in the field of food circulation, fomentation material, and the like.

In most cases, such superabsorbent polymer is being widely used in the field of hygienic goods such as diapers or sanitary pad, and the like. In the hygienic goods, the superabsorbent polymer is generally spread in pulp and included. However, recently, in an effort to provide hygienic goods such as diapers having thinner thickness, development of diapers having decreased pulp content, or even pulpless diapers in which pulp is not used at all, is being actively progressed.

As such, in the case of hygienic goods having decreased pulp, or pulpless hygienic goods, superabsorbent polymer is included at relatively high ratio, and such superabsorbent polymer particles are included inevitably in multilayers. In order for the entire superabsorbent polymer particles included in multilayers to more efficiently absorb liquid such as urine, the superabsorbent polymer should exhibit basically high absorption performance and absorption speed.

Thus, recently, there are continued attempts to provide and prepare superabsorbent polymer exhibiting more improved absorption speed.

As the most common method for increasing absorption speed, a method of forming a porous structure inside of the superabsorbent polymer to broaden the surface area of the superabsorbent polymer may be mentioned.

In order to broaden the surface area of the superabsorbent polymer, previously, crosslinking was progressed using a carbonate based blowing agent to form a porous structure inside of base resin powder, or foam was incorporated in the monomer composition in the presence of surfactant and/or dispersant, and then, crosslinking was progressed to form a porous structure.

However, it is difficult to achieve absorption speed beyond a certain level by previously known methods, and thus, there is a continued demand for development of technology enabling additional improvement in absorption speed.

Furthermore, in order to obtain superabsorbent polymer having more improved absorption speed by the existing methods, excessive amount of blowing agent and/or surfactant is inevitably used, and as the result, the properties of superabsorbent polymer, for example, surface tension, permeability and bulk density, are deteriorated. Particularly, if a blowing agent and surfactant are used during polymerization, pores are formed in the superabsorbent polymer, and thus, strength of the superabsorbent polymer decreases, and fines are generated in large quantities during drying and grinding processes, thereby deteriorating productivity.

Thus, there is a continued demand for development of technology that can not only reduce the use of surfactant and/or blowing agent, but also further improve absorption speed of superabsorbent polymer.

SUMMARY OF THE INVENTION

In order to solve the problems of the prior art, it is an object of the invention to provide a superabsorbent polymer composition that can exhibit rapid absorption speed without using a blowing agent.

According to one aspect of the invention, there is provided a superabsorbent polymer composition comprising:
  a superabsorbent polymer comprising a base resin comprising crosslinked polymer of acrylic acid based monomers having acid groups of which at least a part are neutralized, and an internal crosslinking agent; and a surface crosslink layer formed on the surface of the base resin, in which the crosslinked polymer is additionally crosslinked by a surface crosslinking agent; and
  remaining surface crosslinking agent that does not form the surface crosslink layer,
  wherein the remaining surface crosslinking agent that does not form the surface crosslink layer comprises a carbonate based compound and a diol based compound, the content of the remaining carbonate based compound is 100 ppm or more based on the total weight of the superabsorbent polymer composition, and the content of the remaining diol based compound is 1,000 ppm or more based on the total weight of the superabsorbent polymer composition, and
  the superabsorbent polymer composition fulfills the following 1) to 3):
  1) Vortex time according to a vortex method is 65 seconds or less;
  2) Extractable contents after swelling for 16 hours, measured according to EDANA method WSP 270.3, is 15 wt % or less, based on the total weight of the superabsorbent polymer composition; and
  3) Bulk density is 0.67 g/cm$^3$ or more.

According to another aspect of the invention, there is provided a method for preparing a superabsorbent polymer composition, comprising steps of:
  polymerizing a monomer composition comprising acrylic acid based monomers having acid groups of which at least a part are neutralized, an internal crosslinking agent, and a polymerization initiator, to prepare base resin comprising crosslinked polymer in which the acrylic acid based monomers are crosslinked; and conducting surface crosslinking of the base resin, in the presence of a surface crosslinking agent, wherein the surface crosslinking agent comprises one or more carbonate based compounds and one or more diol based compounds.

According to the superabsorbent polymer composition and preparation method thereof of the invention, superabsorbent polymer that exhibits excellent absorption properties, and can achieve rapid absorption speed, without using a blowing agent, can be provided.

DETAILED DESCRIPTION OF THE EMBODIMENTS

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, a superabsorbent polymer composition and a method for preparing the same according to the embodiments of the invention will be explained in detail.

The superabsorbent polymer composition according to one embodiment of the invention comprises, a superabsorbent polymer comprising a base resin comprising crosslinked polymer of acrylic acid based monomers having acid groups of which at least a part are neutralized, and an internal crosslinking agent; and a surface crosslink layer formed on the surface of the base resin, in which the crosslinked polymer is additionally crosslinked by a surface crosslinking agent; and remaining surface crosslinking agent that does not form the surface crosslink layer, wherein the remaining surface crosslinking agent that does not form the surface crosslink layer comprises a carbonate based compound and a diol based compound, the content of the remaining carbonate based compound is 100 ppm or more based on the total weight of the superabsorbent polymer composition, and the content of the remaining diol based compound is 1,000 ppm or more based on the total weight of the superabsorbent polymer composition, and the superabsorbent polymer composition fulfills the following 1) to 3):

1) Vortex time according to a vortex method is 65 seconds or less;
2) Extractable contents after swelling for 16 hours, measured according to EDANA method WSP 270.3, is 15 wt % or less, based on the total weight of the superabsorbent polymer composition; and
3) Bulk density is 0.67 g/cm$^3$ or more.

And, a method for preparing a superabsorbent polymer composition according to another embodiment of the invention comprise steps of:

polymerizing a monomer composition comprising acrylic acid based monomers having acid groups of which at least a part are neutralized, an internal crosslinking agent, and a polymerization initiator to prepare base resin comprising crosslinked polymer in which the acrylic acid based monomers are crosslinked; and conducting surface crosslinking of the base resin, in the presence of a surface crosslinking agent, wherein the surface crosslinking agent comprises one or more carbonate based compounds and one or more diol based compounds.

For reference, the term "polymer" used herein means the polymerized state of acrylic acid based monomers, and may include those of all moisture content ranges or particle diameter ranges. Among the polymers, those having moisture content of about 40 wt % or more after polymerized and before dried may be designated as hydrogel polymer. And, among the polymers, those having particle diameters of 150 μm or less may be designated as "fines".

And, the term "superabsorbent polymer" means the polymer itself, or it is used to include those made to be appropriate for productization through additional processes, for example, surface crosslinking, particle reassembly, drying, grinding, classification, and the like, according to the context.

As used herein, the term "base resin" or "base resin powder" means particles or powders made by drying and grinding of polymer of acrylic acid based monomers, and it means polymer that is not surface modified or surface crosslinked as explained later.

The hydrogel polymer obtained by polymerization of acrylic acid based monomers is passed through processes of drying, grinding, classification, surface crosslinking, and the like, and is commercialized as powder superabsorbent polymer product. Recently, there is continued attempts to provide superabsorbent polymer exhibiting more improved absorption speed.

As the most common method for increasing vortex time, a method of forming a porous structure inside of superabsorbent polymer to broaden the surface area of superabsorbent polymer may be mentioned. In order to broaden the surface area of superabsorbent polymer, a method of progressing crosslinking polymerization while incorporating a blowing agent in the monomer composition, thereby forming a porous structure in base resin powders, is generally adopted.

However, with the use of a blowing agent, disadvantages such as deterioration of the properties of superabsorbent polymer, for example, surface tension, permeability or bulk density, and the like, and increase in fines are involved, and thus, there is a continued demand for development of technology capable of improving absorption speed of superabsorbent polymer without using a blowing agent.

Thus, the inventors confirmed that without using a blowing agent, by controlling conditions of a surface crosslinking process, superabsorbent polymer exhibiting improved absorption property and absorption speed can be provided, and completed the invention.

More specifically, according to one embodiment of the invention, it was confirmed that by forming a surface crosslink layer on base resin prepared without a foaming process, combining a specific surface crosslinking agent during the surface crosslinking reaction of the base resin, using it beyond a certain amount, and conducting the surface crosslinking reaction under milder conditions than before, superabsorbent polymer exhibiting improved absorption speed even without a porous structure can be prepared.

Thus, according to one embodiment of the invention, superabsorbent polymer maintaining excellent absorption properties, surface tension, permeability, bulk density, and absorption speed, and the like can be provided.

In the preparation method of the superabsorbent polymer composition according to one embodiment of the invention, first, polymerizing a monomer composition comprising acrylic acid based monomers having acid groups of which at least a part are neutralized, an internal crosslinking agent, and a polymerization initiator to prepare base resin comprising crosslinked polymer in which the acrylic acid based monomers are crosslinked.

Hereinafter, it will be explained in more detail.

The monomer composition, which is the raw material of the superabsorbent polymer, comprises acrylic acid based monomers having acid groups of which at least a part are neutralized, and a polymerization initiator.

The acrylic acid based monomer is a compound represented by the following Chemical Formula 1:

  [Chemical Formula 1]

In the Chemical Formula 1, $R^1$ is a C2-5 alkyl group comprising an unsaturated bond, $M^1$ is a hydrogen atom, a monovalent or divalent metal, an ammonium group or an organic amine salt.

Preferably, the acrylic acid based monomers may be one or more selected from the group consisting of acrylic acid, (meth)acrylic acid, and monovalent metal salts, divalent metal salts, ammonium salts and organic amine salts of these acids.

Wherein, the acrylic acid based monomers have acid groups, and at least a part of the acid groups may be neutralized. Preferably, monomers partially neutralized with alkali material such as sodium hydroxide, potassium hydroxide, calcium hydroxide, ammonium hydroxide, and the like may be used. Wherein, the neutralization degree of the acrylic acid based monomers may be 40 to 95 mol %, or 40 to 80 mol %, or 45 to 75 mol %. Although the range of the neutralization degree may vary according to the final properties, if the neutralization degree is too high, neutralized monomers may be precipitated, thus rendering smooth progression of polymerization difficult, and to the contrary, if the neutralization degree is too low, the absorption of the polymer may be significantly lowered, and the polymer may exhibit rubber-like property, which is difficult to handle.

The concentration of the acrylic acid based monomers may be about 20 to about 60 wt %, preferably about 40 to about 50 wt %, based on the monomer composition comprising raw materials and solvents, and it may be appropriately adjusted considering polymerization time and reaction conditions, and the like. However, if the concentration of the monomers is too low, yield of superabsorbent polymer may decrease, thus causing a problem in terms of economical efficiency, and if the concentration is too high, the monomers may be partially precipitated or grinding efficiency during grinding of polymerized hydrogel polymer may be low, thus causing process problems, and the properties of superabsorbent polymer may be deteriorated.

In the preparation method of superabsorbent polymer of the invention, the polymerization initiator used during polymerization is not specifically limited as long as it is commonly used for the preparation of superabsorbent polymer.

Specifically, as the polymerization initiator, a thermal polymerization initiator or a photopolymerization initiator may be used according to polymerization method. However, even in the case of photopolymerization, since a certain amount of heat is generated by UV irradiation, etc., and heat is generated to some degree according to the progression of an exothermic polymerization reaction, a thermal polymerization initiator may be additionally used.

As the photopolymerization initiator, any compounds capable of forming radicals by light such as UV may be used without limitations.

As the photopolymerization initiator, one or more selected from the group consisting of benzoin ether, dialkyl acetophenone, hydroxyl alkylketone, phenyl glyoxylate, benzyl dimethyl ketal, acyl phosphine, and α-aminoketone may be used. As specific examples of the acyl phosphine, commercially available lucirin TPO, namely 2,4,6-trimethyl-benzoyl-trimethyl phosphine oxide) may be used. More various photopolymerization initiators are described in Reinhold Schwalm, "UV Coatings: Basics, Recent Developments and New Application (Elsevier 2007)", page 115, and are not limited to the above described examples.

The photopolymerization initiator may be included in the concentration of about 0.01 to about 1.0 wt %, based on the monomer composition. If the concentration of the photopolymerization initiator is too low, polymerization speed may become slow, and if the concentration of the photopolymerization initiator is too high, the molecular weight of superabsorbent polymer may be small and the properties may become non-uniform.

And, as the thermal polymerization initiator, at least one selected from the group consisting of a persulfate initiator, an azo initiator, hydrogen peroxide, and ascorbic acid may be used. Specific examples of the persulfate initiator may include sodium persulfate ($Na_2S_2O_8$), potassium persulfate ($K_2S_2O_8$), ammonium persulfate (($NH_4)_2S_2O_8$), etc., and, specific examples of the azo initiator may include 2,2-azobis (2-amidinopropane)dihydrochloride, 2,2-azobis-(N,N-dimethylene)isobutyramidinedihydrochloride, 2-(carbamoylazo)isobutyronitril, 2,2-azobis[2-(2-imidazolin-2-yl) propane]dihydrochloride, 4,4-azobis-(4-cyanovalericacid), etc. More various thermal initiators are described in "Principle of Polymerization (Wiley, 1981)", Odian, page 203, and are not limited to the above described examples.

According to one embodiment of the invention, the monomer composition comprises an internal crosslinking agent as raw material of the superabsorbent polymer. As the internal crosslinking agent, a crosslinking agent having one or more functional groups capable of reacting with the acrylic acid based monomers, and having one or more ethylenically unsaturated groups; or a crosslinking agent having two or more functional groups capable of reacting with the substituents of the acrylic acid based monomers and/or substituents formed by hydrolysis of the monomers, may be used.

The internal crosslinking agent is used to crosslink inside of polymer in which acrylic acid based monomers are polymerized, and is distinguished from a surface crosslinking agent used to crosslink the surface of the polymer.

As specific examples of the internal crosslinking agent, one or more selected from the group consisting of N,N'-methylenebisacrylamide, trimethylolpropane tri(meth)acrylate, ethyleneglycol di(meth)acrylate, polyethyleneglycol (meth)acrylate, propyleneglycol di(meth)acrylate, polypropyleneglycol (meth)acrylate, butanediol di(meth)acrylate, butyleneglycol di(meth)acrylate, diethyleneglycol di(meth) acrylate, hexanediol di(meth)acrylate, triethyleneglycol di(meth)acrylate, tripropyleneglycol di(meth)acrylate, tetraethyleneglycol di(meth)acrylate, dipentaerythritol pentaacrylate, glycerin tri(meth)acrylate, pentaerythritol tetraacrylate, triarylamine, ethyleneglycol diglycidyl ether, propyleneglycol, glycerin, polyethyleneglycol diglycidyl ether, and ethylenecarbonate may be used. Such an internal crosslinking agent may be used in the concentration of 0.01 to 0.5 wt %, based on the monomer composition, thus crosslinking polymerized polymer.

According to one embodiment of the invention, the monomer composition does not comprise a blowing agent.

The blowing agent is used to form pores in hydrogel polymer to increase surface area, thereby improving absorption speed. As the blowing agent, carbonate based blowing agents are mainly used, and for example, sodium bicarbonate, sodium carbonate, potassium bicarbonate, potassium carbonate, calcium bicarbonate, calcium carbonate, magnesium bicarbonate or magnesium carbonate, and the like may be mentioned.

However, as explained above, according to the use of a blowing agent, other properties of superabsorbent polymer, such as surface tension, permeability or bulk density, may be deteriorated, and the amount of fines generated may increase. Thus, in order to solve the problems, according to one embodiment of the invention, a blowing agent is not used, thereby achieving excellent absorption speed while maintaining high bulk density and decreasing fines.

In the preparation method of the invention, the monomer composition of the superabsorbent polymer may further comprise additives such as a thickener, a plasticizer, a preservation stabilizer, an antioxidant, etc., as necessary.

The raw materials, such as acrylic acid based monomers having acid groups of which at least a part are neutralized, a photopolymerization initiator, a thermal polymerization initiator, an internal crosslinking agent and additives, may be prepared in the form of a monomer composition solution dissolved in a solvent.

Wherein, the solvent that can be used is not limited in terms of its construction as long as it can dissolve or disperse the above explained raw materials, and for example, one or more selected from water, ethanol, ethyleneglycol, diethyleneglycol, triethyleneglycol, 1,4-butanediol, propyleneglycol, ethyleneglycol monobutyl ether, propyleneglycol monomethyl ether, propyleneglycol monomethyl ether acetate, methylethylketone, acetone, methylamylketone, cyclohexanone, cyclopentanone, diethyleneglycol monomethyl ether, diethyleneglycol ethyl ether, toluene, xylene, butyrolactone, carbitol, methylcellosolve acetate and N,N-dimethylacetamide, etc. may be used alone or in combination.

The solvent may be included in the remaining amount except the above described components, based on the total amount of the monomer composition.

Meanwhile, a method of forming hydrogel polymer by thermal polymerization or photopolymerization of the monomer composition is not specifically limited, as long as it is a commonly used polymerization method.

Specifically, the polymerization method is largely classified into thermal polymerization and photopolymerization according to energy source. Commonly, thermal polymerization may be progressed in a reactor equipped with a stirring axis such as a kneader, and photopolymerization may be progressed in a reactor equipped with a movable conveyer belt, or in a container having a flat bottom, but the above explained polymerization is no more than one example, and the present disclosure is not limited thereto.

For example, hydrogel polymer may be obtained by introducing the above described monomer composition into a reactor equipped with a stirring axis such as a kneader, and supplying hot air or heating the reactor to progress thermal polymerization. Wherein, the hydrogel polymer discharged to the outlet of the reactor may be obtained in the size of a few centimeters to a few millimeters according to the shape of the stirring axis equipped in the reactor. Specifically, the size of obtained hydrogel polymer may vary according to the concentration of the introduced monomer composition and the introduction speed, etc., and commonly, hydrogel polymer with weight average particle diameter of 2 to 50 mm may be obtained.

And, in case photopolymerization is progressed in a reactor equipped with a movable conveyer belt or in a container having a flat bottom as explained above, the obtained hydrogel polymer may be in the form of a sheet having the width of the belt. Wherein, the thickness of the polymer sheet may vary according to the concentration of the introduced monomer mixture and the introduction speed, but, commonly, a monomer mixture is preferably fed such that polymer in the form of a sheet having a thickness of about 0.5 cm to about 5 cm may be obtained. In case a monomer mixture is fed such that the thickness of sheet-shaped polymer may be too thin, production efficiency may be low, and if the thickness of the sheet-shaped polymer is greater than 5 cm, due to the too thick thickness, a polymerization reaction may not uniformly occur throughout the whole thickness.

Wherein, the moisture content of hydrogel polymer obtained by such a method may be about 40 to about 80 wt %. Throughout the specification, the "moisture content" is the content of moisture occupied based on the total weight of hydrogel polymer, and it means a value obtained by subtracting the weight of polymer of a dry state from the weight of hydrogel polymer. Specifically, it is defined as a value calculated by measuring the weight loss according to moisture evaporation in the polymer while raising the temperature of polymer through infrared heating to dry.

At this time, the drying condition is set up such that the temperature is raised from room temperature to about 180° C. and then maintained at 180° C., and the total drying time is 20 minutes including a temperature raising step of 5 minutes.

Next, the obtained hydrogel polymer is dried.

Wherein, as necessary, a coarse grinding step may be further conducted before drying so as to increase drying efficiency.

Wherein, grinders that can be used in the coarse grinding are not limited in terms of the constructions, but specifically, one selected from the group consisting of a vertical pulverizer, a turbo cutter, a turbo grinder, a rotary cutter mill, a cutter mill, a disc mill, a shred crusher, a crusher, a chopper, a disc cutter may be used, but are not limited thereto.

Wherein, the grinding step may be progressed such that particle diameter of hydrogel polymer may become about 2 to about 10 mm.

Grinding to a particle diameter of less than 2 mm would not be technically easy due to the high moisture content of the hydrogel polymer, and may generate aggregation between the ground particles. Meanwhile, if grinding to a particle diameter greater than 10 mm, the effect of increasing the efficiency of the subsequent drying step may be insignificant.

The hydrogel polymer coarsely ground as explained above, or hydrogel polymer immediately after polymerization that does not pass through the coarse grinding step is dried, and the drying temperature may be about 150° C. to about 250° C. If the drying temperature is less than about 150° C., a drying time may too lengthen, and the properties of the finally prepared superabsorbent polymer may be deteriorated, and if the drying temperature is greater than about 250° C., only the surface of hydrogel polymer may be dried, thus generating fines in the subsequent grinding process, and the properties of the finally prepared superabsorbent polymer may be deteriorated. Preferably, the drying may be progressed at a temperature of about 150 to 200° C., more preferably at 160 to 180° C.

Meanwhile, the drying may be progressed for about 20 minutes to about 90 minutes considering the process efficiency, but it not limited thereto.

And, the drying method is not limited in terms of the construction as long as it can be commonly used as a drying process of hydrogel polymer. Specifically, the drying step may be progressed by hot wind supply, infrared ray irradiation, ultrahigh frequency wave irradiation, or UV irradiation, etc. The polymer dried by such a method may exhibit a moisture content of about 0.1 to about 10 wt %.

And then, a step of grinding dried polymer obtained through the drying step is conducted.

The polymer powder obtained after the grinding step may have a particle diameter of about 150 to about 850 μm. As a grinder used for grinding to such a particle diameter, specifically, a pin mill, a hammer mill, a screw mill, a roll mill, a disc mill, or a jog mill, etc. may be used, but the invention is not limited thereto.

And, in order to manage the properties of superabsorbent polymer powder finally productized after the grinding step, a process of classifying the polymer powders obtained after grinding according to particle diameters may be conducted, and the polymer powders may be classified such that the weight ratio of powders having specific particle diameters may fall within a specific range.

Particles or powders made by drying and grinding the polymer in which acrylic acid based monomers are polymerized, by the above explained process, are referred to as base resin.

The base resin prepared above may have centrifuge retention capacity (CRC) measured according to EDANA method WSP 241.3, of about 32 g/g or more, or about 33 g/g or more, or about 34 g/g or more, and about 50 g/g or less, or about 49 g/g or less, or about 48 g/g or less.

In the surface crosslinking step described below, centrifuge retention capacity (CRC) of base resin inevitably decreases, but according to the present disclosure, centrifuge retention capacities before and after surface crosslinking are not significantly different, and thus, even if centrifuge retention capacity of base resin is controlled within the above range, centrifuge retention capacity of the final product may be still maintained high.

Next, surface crosslinking of the base resin is conducted in the presence of a surface crosslinking agent, thus forming a surface crosslink layer in which the crosslinked polymer is additionally crosslinked by a surface crosslinking agent, on the surface of the base resin.

In the general preparation method of superabsorbent polymer, a surface crosslinking solution comprising a surface crosslinking agent is mixed with dried and ground polymer, namely base resin, and then, the mixture is heated to raise temperature, thereby conducting surface crosslinking of the ground polymer.

The surface crosslinking step induces a crosslinking reaction on the surface of the ground polymer in the presence of a surface crosslinking agent, thereby forming superabsorbent polymer having more improved properties, particularly improved absorption speed. Through such surface crosslinking, a surface crosslink layer is formed on the surface of the ground polymer particles.

In general, since the surface crosslinking agent is applied on the surfaces of superabsorbent polymer particles, the surface crosslinking reaction occurs on the surfaces of superabsorbent polymer particles, thereby improving crosslinkability on the surfaces of particles without substantially influencing the inside of the particles. Thus, surface crosslinked superabsorbent polymer particles have higher crosslinking degree around the surfaces.

Superabsorbent polymer on which a surface crosslink layer is formed has increased absorption speed compared to base resin before forming a surface crosslink layer, but has decreased absorption capacity such as centrifuge retention capacity (CRC). Thus, the properties of the final product vary according to the centrifuge retention capacity of base resin, thickness of a surface crosslink layer, and crosslinking density, and the like, and in order to prepare superabsorbent polymer having balanced absorption capacity and absorption speed, it is needed to specifically control the surface crosslinking reaction.

According to one embodiment of the invention, by using one or more carbonate based compounds and one or more diol based compounds in combination as a surface crosslinking agent in the surface crosslinking step, absorption speed can be improved without significant decrease in centrifuge retention capacity.

More specifically, according to one embodiment of the invention, one or more carbonate based compounds may be selected from the group consisting of ethylene carbonate, propylene carbonate, butylenes carbonate, and glycerol carbonate, and one or more diol based compounds may be selected from the group consisting of ethylene glycol, 1,3-propandiol, 1,4-butandiol, propylene glycol, and glycerol.

For example, as the surface crosslinking agent of the present disclosure, 4 kinds of ethylene carbonate, propylene carbonate, glycerol carbonate, and propylene glycol may be used.

For another example, as the surface crosslinking agent of the present disclosure, 3 kinds of ethylene carbonate, propylene carbonate, and propylene glycol may be used.

And, the carbonate based compound may be used in the content of 0.4 parts by weight or more, or 0.6 parts by weight or more, and 2.5 parts by weight or less, or 2.0 parts by weight or less, based on 100 parts by weight of the base resin.

And, the diol based compound may be used in the content of 0.2 parts by weight or more, or 0.25 parts by weight or more, and 3.0 parts by weight or less, or 2.0 parts by weight or less, based on 100 parts by weight of the base resin.

When the contents of the carbonate based surface crosslinking agent and the diol based surface crosslinking agent are within the above ranges, absorption properties and absorption speed can be simultaneously improved.

By conducting the surface crosslinking step using the above content of surface crosslinking agent, after the surface crosslinking reaction is finished, the remaining surface crosslinking agent that does not form a surface crosslink layer is included in the superabsorbent polymer composition.

The remaining surface crosslinking agent that does not form a surface crosslink layer may comprise unreacted surface crosslinking agent that has not reacted with the crosslinked polymer and remained, and decomposition product of the surface crosslinking agent after the surface crosslinking reaction.

In the remaining surface crosslinking agent, the carbonate based compound may be 100 ppm or more, for example 400 ppm or more, or 500 ppm or more, and 2,000 ppm or less, or 1,800 ppm or less, or 1000 ppm or less, or 900 ppm or less, based on the total weight of the superabsorbent polymer composition.

And, the remaining diol based compound may be 1,000 ppm or more, for example 1,000 ppm or more, or 1,100 ppm or more, and 10,000 ppm or less, or 9,000 ppm or less, or 2,000 ppm or less, or 1,800 ppm or less, based on the total weight of the superabsorbent polymer composition.

Since the superabsorbent polymer composition of the present disclosure comprises the remaining carbonate based compounds and diol based compounds in the above contents, improved absorption speed can be achieved without deterioration of other properties.

Meanwhile, when adding the surface crosslinking agent, it may be added in the form of a surface crosslinking solution by additionally mixing water together. In case water is added, the surface crosslinking agent may be uniformly dispersed in the polymer. Wherein, water may be preferably added in the content of about 1 to about 10 parts by weight, based on 100 parts by weight of the base resin, so as to induce uniform dispersion of the surface crosslinking agent, prevent agglomeration of polymer powders, and optimizing surface penetration depth of the surface crosslinking agent.

Meanwhile, in the above explained surface crosslinking step, multivalent metal salts, for example, aluminum salts, more specifically, one or more selected from the group consisting of sulfate, potassium salt, ammonium salt, sodium salt and hydrochloride of aluminum may be further used, besides the surface crosslinking agent.

By heating the mixture of the base resin and surface crosslinking agent to raise temperature, a surface crosslink layer in which the crosslinked polymer is additionally crosslinked by the surface crosslinking agent is formed on the surface of the base resin.

Meanwhile, according to one embodiment of the invention, the surface crosslinking reaction step may be conducted at lower temperature than the previous temperature condition. For example, the surface crosslinking reaction may be progressed at a temperature of 60 to 190° C., or 60 to 188° C., or 60 to 186° C. for 20 to 100 minutes.

A surface crosslinking reaction is commonly conducted at a temperature greater than 190° C., and due to the surface crosslinking reaction at such a high temperature, color of the product may be yellowed, and unpleasant smell may become severe during swelling of the superabsorbent polymer.

However, according to one embodiment of the invention, by conducting the surface crosslinking reaction at lower temperature than before, such problems may be prevented.

A temperature rise means for the surface crosslinking reaction is not specifically limited. A heating medium may be supplied, or a heat source may be directly supplied to heat. Wherein, the kinds of the heating medium that can be used may include temperature-increased fluid such as steam, hot air, hot oil, etc., but are not limited thereto, and may be appropriately selected considering the means of the heating medium, temperature rise speed and a temperature to be increased. Meanwhile, the heat source directly supplied may include electric heating, gas heating, etc., but is not limited thereto.

Thus, according to one embodiment of the invention, due to non-use of a blowing agent, properties of the base resin, and optimization of the surface crosslinking step, and the like, superabsorbent polymer composition that has rapid absorption speed without deterioration of centrifuge retention capacity and absorbency under pressure, and has excellent surface tension, permeability and bulk density, can be provided.

Thus, a superabsorbent polymer composition according to one embodiment comprises: superabsorbent polymer comprising base resin comprising crosslinked polymer of acrylic acid based monomers having acid groups of which at least a part are neutralized and an internal crosslinking agent, and a surface crosslink layer formed on the surface of the base resin, in which the crosslinked polymer is additionally crosslinked by a surface crosslinking agent; and remaining surface crosslinking agent that does not form the surface crosslink layer, wherein the remaining surface crosslinking agent that does not form the surface crosslink layer comprises a carbonate based compound and a diol based compound, the content of the remaining carbonate based compound is 100 ppm or more based on the total weight of the superabsorbent polymer composition, and the content of the remaining diol based compound is 1,000 ppm or more based on the total weight of the superabsorbent polymer composition, and the superabsorbent polymer composition fulfills the following 1) to 3):

1) Vortex time according to a vortex method is 65 seconds or less;
2) Extractable contents after swelling for 16 hours, measured according to EDANA method WSP 270.3, is 15 wt % or less, based on the total weight of the superabsorbent polymer composition; and
3) Bulk density is 0.67 g/cm$^3$ or more.

And, the surface crosslinking agent may comprise one or more carbonate based compounds and one or more diol based compounds.

The one or more carbonate based compounds may be selected from the group consisting of ethylene carbonate, propylene carbonate, butylenes carbonate, and glycerol carbonate, and the one or more diol based compounds may be selected from the group consisting of ethylene glycol, 1,3-propandiol, 1,4-butandiol, propylene glycol, and glycerol.

For example, as the surface crosslinking agent of the present disclosure, 4 kinds of ethylene carbonate, propylene carbonate, glycerol carbonate, and propylene glycol may be used.

For another example, as the surface crosslinking agent of the present disclosure, 3 kinds of ethylene carbonate, propylene carbonate, and propylene glycol may be used.

In the remaining surface crosslinking agent, the carbonate based compound may be 100 ppm or more, for example 400 ppm or more, or 500 ppm or more, and 2,000 ppm or less, or 1,800 ppm or less, or 1000 ppm or less, or 900 ppm or less, based on the total weight of the superabsorbent polymer composition.

And, the remaining diol based compound may be 1,000 ppm or more, for example 1,000 ppm or more, or 1,100 ppm or more, and 10,000 ppm or less, or 9,000 ppm or less, or 2,000 ppm or less, or 1,800 ppm or less, based on the total weight of the superabsorbent polymer composition.

Since the superabsorbent polymer composition of the present disclosure comprises the remaining carbonate based compounds and diol based compounds in the above contents, improved absorption speed can be achieved without deterioration of other properties.

And, since centrifuge retention capacity (CRC) of the base resin is controlled low, the superabsorbent polymer composition has low extractable contents (EC). More specifically, the superabsorbent polymer composition may have extractable contents after swelling for 16 hours, measured according to EDANA method WSP 270.3, of 15 wt % or less, for example 14.5 wt % or less, or 13 wt % or less, or 12.5 wt % or less, or 11 wt % or less, based on the total weight of the superabsorbent polymer composition. The smaller extractable contents (EC) value is more excellent, and thus, the lower limit of the extractable contents (EC) is theoretically 0 wt %, but for example, it may be 1 wt % or more, or 2 wt % or more, or 3 wt % or more.

And, the superabsorbent polymer composition has high bulk density because the monomer composition is not foamed. More specifically, the superabsorbent polymer composition may have bulk density, measured according to WSP 250.3, of 0.67 g/cm³ or more, or 0.68 g/cm³ or more, and 0.80 g/cm³ or less, or 0.75 g/cm³ or less, or 0.70 g/cm³ or less.

And, the superabsorbent polymer composition of the present disclosure may have vortex time of 65 seconds or less, or about 60 seconds or less, or about 58 seconds or less, or 55 seconds or less, or 52 seconds or less. The smaller vortex time is more excellent, and thus, the lower limit of the vortex time is theoretically 0 second, but for example, it may be about 5 seconds or more, or about 10 seconds or more, or about 12 seconds or more.

The vortex time means a time (unit: second) when vortex of liquid disappears by rapid absorption, when superabsorbent polymer is added to a saline solution and stirred, and it is considered that as the time is shorter, superabsorbent polymer has more rapid initial absorption speed.

And, the superabsorbent polymer composition of the present disclosure may have centrifuge retention capacity (CRC), measured according to EDANA method WSP 241.3, of about 29 g/g or more, or about 30 g/g or more, or about 31 g/g or more, and about 40 g/g or less, or about 38 g/g or less, or about 35 g/g or less.

And, the superabsorbent polymer composition of the present disclosure may fulfill the following Relation Formula 1.

1 g/g≤centrifuge retention capacity (CRC) of the base resin measured according to EDANA method WSP 241.3−centrifuge retention capacity (CRC) of the superabsorbent polymer composition measured according to EDANA method WSP 241.3≤12 g/g    [Relation Formula 1]

According to the Relation Formula 1, centrifuge retention capacity (CRC) of base resin is higher than centrifuge retention capacity (CRC) of superabsorbent polymer composition comprising a surface crosslink layer, by about 1 to about 12 g/g, or about 2 to about 12 g/g, or about 3 to about 12 g/g, or about 3 to about 11 g/g, or about 3 to about 10 g/g, or about 3 to about 8 g/g, or about 3 to about 7 g/g. By preparing base resin having small centrifuge retention capacity difference from the final product, namely superabsorbent polymer composition, and then, conducting a surface crosslinking step under specific conditions, a product in which centrifuge retention capacity is not significantly decreased and absorption speed is improved, can be provided.

And, the superabsorbent polymer composition of the present disclosure may have absorbency under pressure (AUP) of 0.7 psi, measured according to EDANA method WSP 242.3, of about 21 g/g or more, or about 22 g/g or more, or about 23 g/g or more, and about 30 g/g or less, or about 29 g/g or less, or about 28 g/g or less.

The method for preparing a superabsorbent polymer composition according to the invention, wherein the step of preparing the base resin comprises steps of:
  polymerizing a monomer composition comprising acrylic acid based monomers having acid groups of which at least a part are neutralized, an internal crosslinking agent, and a polymerization initiator, to form hydrogel polymer;
  drying the hydrogel polymer;
  grinding the dried polymer; and
  classifying the ground polymer.

The present disclosure will be explained in more detail in the following examples. However, these examples are presented only as the illustrations of the invention, and the scope of the invention is not limited thereby.

EXAMPLE

Preparation of Superabsorbent Polymer

Example 1

In a 3 L glass container equipped with a stirrer and a thermometer, 600 g of acrylic acid, 2.04 g of an internal crosslinking agent PEGDA400 (polyethyleneglycol diacrylate 400), 0.048 g of a photoinitiator diphenyl(2,4,6-trimethylbenzoyl)-phosphine oxide, 1.2 g of a thermal initiator sodium persulfate (SPS), and 974.7 g of 24.0% sodium hydroxide solution were mixed to prepare an aqueous solution of water soluble unsaturated monomers (neutralization degree: 70 mol %; solid content: 45 wt %)

Thereafter, when the temperature of the monomer aqueous solution became 50° C., it was irradiated by UV for 1 minute (irradiation amount: 10 mW/cm²) to conduct UV polymerization, and maintained in the polymerization reactor for 2 minutes, thus obtaining hydrogel polymer. After grinding the obtained hydrogel polymer to 2 mm*2 mm size, the moisture content (180° C., 40 minutes) was measured to be 47%.

The obtained gel type polymer was spread to a thickness of about 30 mm on a stainless wire gauze having a hole size of 600 μm, and dried in a 180° C. hot air oven for 30 minutes. The obtained dried polymer was ground using a grinder, and classified with a ASTM standard sieve, thus obtaining base resin having particle size of 150 to 850 μm.

Thereafter, a surface treating solution comprising, based on 100 parts by weight of the prepared base resin, 5.4 parts by weight of water, 0.9 parts by weight of ethylene carbonate, 0.9 parts by weight of propylene carbonate, 0.2 parts by weight of propylene glycol, 0.6 parts by weight of glycerol carbonate, and 0.4 parts by weight of Al—S (18 hydrate) was uniformly mixed, and then, fed to one surface crosslinking reactor, and surface crosslinking of the base resin was progressed at 186° C. for 60 minutes.

After the surface treatment was finished, surface-treated superabsorbent polymer having average particle diameter of 150 to 850 μm was obtained using a sieve.

Example 2

Superabsorbent polymer was prepared by the same method as Example 1, except that the surface crosslinking reaction was conducted for 40 minutes.

Example 3

Superabsorbent polymer was prepared by the same method as Example 1, except that 2.16 g of PEGDA400 was used during polymerization, and the surface crosslinking reaction was conducted for 55 minutes.

Example 4

Base resin was prepared by the same method as Example 1, except that 2.54 g of PEGDA400 was used during polymerization, and a surface treating solution comprising, based on 100 parts by weight of the prepared base resin, 5.4 parts by weight of water, 0.6 parts by weight of ethylene carbonate, 0.6 parts by weight of propylene carbonate, 0.2 parts by weight of propylene glycol, and 0.4 parts by weight of Al—S (18 hydrate) was uniformly mixed, and then, fed to one surface crosslinking reactor, and surface crosslinking of the base resin was progressed at 186° C. for 50 minutes.

Example 5

Superabsorbent polymer was prepared by the same method as Example 4, except that the surface crosslinking reaction was conducted for 60 minutes.

Example 6

Superabsorbent polymer was prepared by the same method as Example 1, except that 1.74 g of PEGDA400 was used during polymerization.

Comparative Example 1

Base resin was prepared by the same method as Example 1, except that 1.92 g of PEGDA400 was used, and a surface treating solution comprising, based on 100 parts by weight of the prepared base resin, 3.0 parts by weight of water, 3.5 parts by weight of methanol, 0.25 parts by weight of 1,3-propanediol, and 0.15 parts by weight of oxalic acid was uniformly mixed, and then, fed to one surface crosslinking reactor, and surface crosslinking of the base resin was progressed at 195° C. for 65 minutes.

Comparative Example 2

Superabsorbent polymer was prepared by the same method as Example 1, except that the surface crosslinking was conducted at 195° C. for 65 minutes.

Comparative Example 3

Base resin was prepared by the same method as Example 1, except that 1.32 g of PEGDA400 was used, and a surface treating solution comprising, based on 100 parts by weight of the prepared base resin, 2.7 parts by weight of water, 4.0 parts by weight of methanol, 0.15 parts by weight of ethylene carbonate, and 1.0 part by weight of Al—S (18 hydrate) was uniformly mixed, and then, fed to one surface crosslinking reactor, and surface crosslinking of the base resin was progressed at 195° C. for 70 minutes.

Comparative Example 4

Superabsorbent polymer was prepared by the same method as Comparative Example 3, except that the surface crosslinking was conducted at 195° C. for 80 minutes.

Experimental Example

For the superabsorbent polymers prepared in Examples and Comparative Examples, the properties were evaluated as follows.

Unless otherwise described, all the following property evaluations were progressed under constant temperature constant humidity conditions (23±2° C., relative humidity 50±10%), and a saline solution means a 0.9 wt % sodium chloride (NaCl) aqueous solution.

(1) Centrifuge Retention Capacity (CRC)

Centrifuge retention capacity (CRC) by absorption rate under no load of each polymer was measured according to EDANA WSP 241.3.

Specifically, $W_0$ (g, about 0.2 g) of the superabsorbent polymers were uniformly put in an envelope made of non-woven fabric, and the envelope was sealed, and then, soaked in a 0.9 wt % sodium chloride aqueous solution (saline solution) at room temperature. After 30 minutes, the envelope was drained at 250 G for 3 minutes using a centrifuge, and then, the weight $W_2$ (g) of the envelope was measured. And, after the same operation using an empty envelope without a sample, the weight $W_1$ (g) at that time was measured. Using the obtained weights, CRC (g/g) was calculated according to the following Formula.

$$CRC\ (g/g) = \{[W_2(g) - W_1(g)]/W_0(g)\} - 1 \quad \text{[Mathematical Formula 1]}$$

(2) Absorbency Under Pressure (AUP)

Absorbency under pressure of 0.7 psi of each polymer was measured according to EDANA method WSP 242.3.

Specifically, a 400 mesh wire netting made of stainless was installed on the bottom of a plastic cylinder with an inner diameter of 60 mm. Under the conditions of room temperature and relative humidity of 50%, $W_0$ (g, 0.90 g) of superabsorbent polymer were uniformly scattered on the wire netting, and a piston that can uniformly give a load of 0.7 psi was put on the superabsorbent polymer. Wherein, as the piston, a piston having an outer diameter slightly smaller than 60 mm was used such that there was no gap with the inner wall of the cylinder, and the movement upward and downward was not hindered. At this time, the weight $W_3$ (g) of the apparatus was measured.

Subsequently, on the inner side of a petri dish having a diameter of 150 mm, a glass filter having a diameter of 90 mm and a thickness of 5 mm was positioned, and a 0.9 wt % sodium chloride aqueous solution (saline solution) was poured on the petri dish. Wherein, the saline solution was poured until the water level of the saline solution became the same level to the upper side of the glass filter. And, one filter paper with a diameter of 90 mm was put thereon. On the filer paper, the above prepared apparatus was mounted, and the liquid was absorbed for 1 hour under load. After 1 hour, the weight $W_4$ (g) was measured.

Using the measured weights, absorbency under pressure (g/g) was calculated according to the following Formula.

$$AUP(g/g) = [W_4(g) - W_3(g)]/W_0(g) \quad \text{[Mathematical Formula 2]}$$

(3) Vortex Time

The vortex time was calculated by introducing 2 g of superabsorbent polymer into 50 mL of a saline solution of 23° C. to 24° C., stirring at 600 rpm with a magnetic bar (diameter 8.5 mm, length 30 mm), and measuring a time until vortex disappeared in the unit of seconds.

(4) Extractable Contents (EC)

Extractable contents were measured according to EDANA method WSP 270.3.

(5) Bulk Density

Bulk density was measured according to WSP 250.3 method.

The property values of Examples and Comparative Examples are summarized in the following Table 1.

TABLE 1

| | Base resin (before surface crosslinking) | | Superabsorbent polymer (after surface crosslinking) | | | | | | |
|---|---|---|---|---|---|---|---|---|---|
| | CRC (g/g) | Vortex (sec) | CRC (g/g) | EC (wt %) | Vortex (sec) | 0.7 psi AUP (g/g) | bulk density (g/cm$^3$) | Remaining carbonate compound (ppm) | Remaining diol compound (ppm) |
| Example 1 | 40.0 | 51 | 32.5 | 12.1 | 51 | 22.6 | 0.67 | 884 | 1648 |
| Example 2 | 40.0 | 51 | 35.5 | 14.5 | 47 | 22.6 | 0.68 | 855 | 1605 |
| Example 3 | 39.1 | 52 | 32.3 | 12.4 | 52 | 22.1 | 0.69 | 873 | 1742 |
| Example 4 | 35.0 | 55 | 29.5 | 7.6 | 60 | 23.4 | 0.68 | 527 | 1375 |
| Example 5 | 35.0 | 55 | 32.0 | 10.1 | 58 | 23.4 | 0.67 | 509 | 1361 |
| Example 6 | 44.0 | 49 | 33.4 | 14.8 | 59 | 23.7 | 0.69 | 854 | 2456 |
| Comparative Example 1 | 48.0 | 50 | 35.0 | 17.0 | 86 | 22.0 | 0.69 | 0 | 915 |
| Comparative Example 2 | 45.0 | 50 | 32.5 | 16.0 | 89 | 22.0 | 0.70 | 0 | 970 |
| Comparative Example 3 | 54.0 | 48 | 37.5 | 17.7 | 85 | 18.5 | 0.68 | 42 | 55 |
| Comparative Example 4 | 54.0 | 48 | 36.6 | 17.2 | 82 | 23.0 | 0.69 | 36 | 48 |

Referring to Table 1, it was confirmed that all the Examples of the present disclosure exhibit excellent absorption capacity, absorption speed and bulk density.

What is claimed is:

1. A superabsorbent polymer composition comprising:
   a superabsorbent polymer comprising a base resin comprising crosslinked polymer of acrylic acid based monomers having acid groups of which at least a part are neutralized, and an internal crosslinking agent; and a surface crosslink layer formed on the surface of the base resin, in which the crosslinked polymer is additionally crosslinked by a surface crosslinking agent; and
   remaining surface crosslinking agent that does not form the surface crosslink layer,
   wherein the remaining surface crosslinking agent that does not form the surface crosslink layer comprises a carbonate based compound and a diol based compound, a content of the carbonate based compound is 100 ppm or more based on a total weight of the superabsorbent polymer composition, and the content of the diol based compound is 1,000 ppm or more based on the total weight of the superabsorbent polymer composition, and
   the superabsorbent polymer composition fulfills the following 1) to 3):
   1. Vortex time according to a vortex method is 65 seconds or less;
   2. Extractable contents after swelling for 16 hours, measured according to EDANA method WSP 270.3, is 15 wt % or less, based on the total weight of the superabsorbent polymer composition; and
   3. Bulk density is 0.67 g/cm$^3$ or more.

2. The superabsorbent polymer composition according to claim 1, wherein the surface crosslinking agent comprises one or more carbonate based compounds and one or more diol based compounds.

3. The superabsorbent polymer composition according to claim 1, wherein the carbonate based compound is selected from the group consisting of ethylene carbonate, propylene carbonate, butylenes carbonate, and glycerol carbonate, and the diol based compound is selected from the group consisting of ethylene glycol, 1,3-propandiol, 1,4-butandiol, propylene glycol, and glycerol.

4. The superabsorbent polymer composition according to claim 3, wherein the surface crosslinking agent is ethylene carbonate, propylene carbonate, glycerol carbonate, and propylene glycol, or
   ethylene carbonate, propylene carbonate, and propylene glycol.

5. The superabsorbent polymer composition according to claim 1,
   wherein the superabsorbent polymer composition fulfills the following Relation Formula 1:

1 g/g≤centrifuge retention capacity (CRC) of the base resin measured according to EDANA method WSP 241.3−centrifuge retention capacity (CRC) of the superabsorbent polymer composition measured according to EDANA method WSP 241.3≤12 g/g    [Relation Formula 1].

6. The superabsorbent polymer composition according to claim 1, wherein the vortex time according to the vortex method is 60 seconds or less.

7. The superabsorbent polymer composition according to claim 1, wherein the extractable contents (after swelling for 16 hours) measured according to EDANA method WSP 270.3 is 3 to 15 wt %, based on the total weight of the superabsorbent polymer composition.

8. A method for preparing the superabsorbent polymer composition according to claim 1, comprising:
   polymerizing a monomer composition comprising acrylic acid based monomers having acid groups of which at least a part are neutralized, an internal crosslinking agent, and a polymerization initiator to prepare base resin comprising crosslinked polymer in which the acrylic acid based monomers are crosslinked; and
   conducting surface crosslinking of the base resin, in the presence of a surface crosslinking agent,
   wherein the surface crosslinking agent comprises a carbonate based compound and a diol based compound.

9. The method for preparing a superabsorbent polymer composition according to claim 8, wherein the carbonate based compound is selected from the group consisting of ethylene carbonate, propylene carbonate, butylenes carbonate, and glycerol carbonate, and the diol based compound is selected from the group consisting of ethylene glycol, 1,3-propandiol, 1,4-butandiol, propylene glycol, and glycerol.

10. The method for preparing a superabsorbent polymer composition according to claim 9, wherein surface crosslinking agent is ethylene carbonate, propylene carbonate, glycerol carbonate, and propylene glycol, or ethylene carbonate, propylene carbonate, and propylene glycol.

11. The method for preparing a superabsorbent polymer composition according to claim 9, wherein the carbonate based compound is used in an amount of 0.4 to 2.5 parts by weight, based on 100 parts by weight of the base resin, and the diol based compound is used in an amount of 0.2 to 3.0 parts by weight, based on 100 parts by weight of the base resin.

12. The method for preparing a superabsorbent polymer composition according to claim 8, wherein the surface crosslinking is conducted at a temperature of 60 to 190° C.

13. The method for preparing a superabsorbent polymer composition according to claim 8, wherein the preparing the base resin comprises:

polymerizing the monomer composition comprising the acrylic acid based monomers having acid groups of which at least a part are neutralized, an internal cross-linking agent, and a polymerization initiator, to form hydrogel polymer;

drying the hydrogel polymer to form dried polymer;

grinding the dried polymer to form ground polymer; and classifying the ground polymer.

14. The method for preparing a superabsorbent polymer composition according to claim 13, wherein the monomer composition does not comprise a blowing agent.

15. The superabsorbent polymer composition according to claim 1, wherein the vortex time means a time (unit: second) when vortex of liquid disappears by absorption, when superabsorbent polymer is added to a saline solution and stirred.

16. The superabsorbent polymer composition according to claim 1, wherein the vortex method comprises introducing 2 g the superabsorbent polymer composition into 50 mL of a saline solution at 23° C. to 24° C., stirring at 600 rpm with a magnetic bar, and measuring a time until vortex disappeared in the unit of seconds, to obtain the vortex time.

* * * * *